(12) United States Patent
Lai

(10) Patent No.: US 12,321,298 B2
(45) Date of Patent: Jun. 3, 2025

(54) PHYSICAL LAYER MODULE AND NETWORK MODULE

(71) Applicant: FARADAY TECHNOLOGY CORPORATION, Hsinchu (TW)

(72) Inventor: Chun-Yuan Lai, Hsinchu (TW)

(73) Assignee: FARADAY TECHNOLOGY CORPORATION, Hsinchu (TW)

( * ) Notice: Subject to any disclaimer, the term of this patent is extended or adjusted under 35 U.S.C. 154(b) by 18 days.

(21) Appl. No.: 18/432,412

(22) Filed: Feb. 5, 2024

(65) Prior Publication Data

US 2024/0330225 A1    Oct. 3, 2024

(30) Foreign Application Priority Data

Mar. 29, 2023  (TW) .................................. 112112026

(51) Int. Cl.
*G06F 13/14*    (2006.01)
*G06F 13/40*    (2006.01)

(52) U.S. Cl.
CPC ................................ *G06F 13/4068* (2013.01)

(58) Field of Classification Search
CPC .................................................. G06F 13/4068
See application file for complete search history.

(56) References Cited

U.S. PATENT DOCUMENTS

| | | | | |
|---|---|---|---|---|
| 6,385,669 B1* | 5/2002 | Creedon | ............... | H04L 12/403 713/400 |
| 6,879,579 B1* | 4/2005 | Myles | ................... | H04W 74/02 370/348 |
| 7,260,120 B2* | 8/2007 | Kang | .................... | H04L 49/352 370/542 |
| 8,018,878 B2* | 9/2011 | Snauwaert | ........ | H04L 12/40013 370/465 |
| 8,792,541 B2* | 7/2014 | Sakai | .................... | H04J 3/0682 375/349 |
| 9,461,747 B2* | 10/2016 | Tanaka | .................. | H04B 10/40 |
| 9,501,403 B2* | 11/2016 | Tanaka | .................. | H04B 10/40 |
| 11,924,141 B2* | 3/2024 | Li | ......................... | H04W 72/23 |
| 2011/0179462 A1* | 7/2011 | Kubo | ................. | H04L 43/0811 725/110 |

(Continued)

FOREIGN PATENT DOCUMENTS

TW              312074 B        8/1997

*Primary Examiner* — Cheng Yuan Tseng
(74) *Attorney, Agent, or Firm* — WPAT, PC

(57) ABSTRACT

A physical layer module and a network module are provided. The network module includes the physical layer module and a media access control module. The physical layer module includes a group decoder, an input selection module, and a device module. The group decoder decodes a common input data signal generated according to a management data input/output signal to generate a group selection signal. The input selection module includes X input circuits being classified into M groups. The X input circuits generate X device input data according to the common input data signal and the group selection signal. The device module includes K physical layer devices classified into M groups. The K physical devices receive X device input data from the X input circuits. An m-th group corresponds to at least one input circuit and N[m] physical layer devices.

20 Claims, 8 Drawing Sheets

(56) References Cited

U.S. PATENT DOCUMENTS

| | | | |
|---|---|---|---|
| 2012/0207478 A1* | 8/2012 | Tanaka | H04B 10/40 |
| | | | 398/79 |
| 2013/0265146 A1* | 10/2013 | Jia | G06F 13/4291 |
| | | | 340/12.22 |
| 2024/0330225 A1* | 10/2024 | Lai | G06F 13/4068 |

* cited by examiner

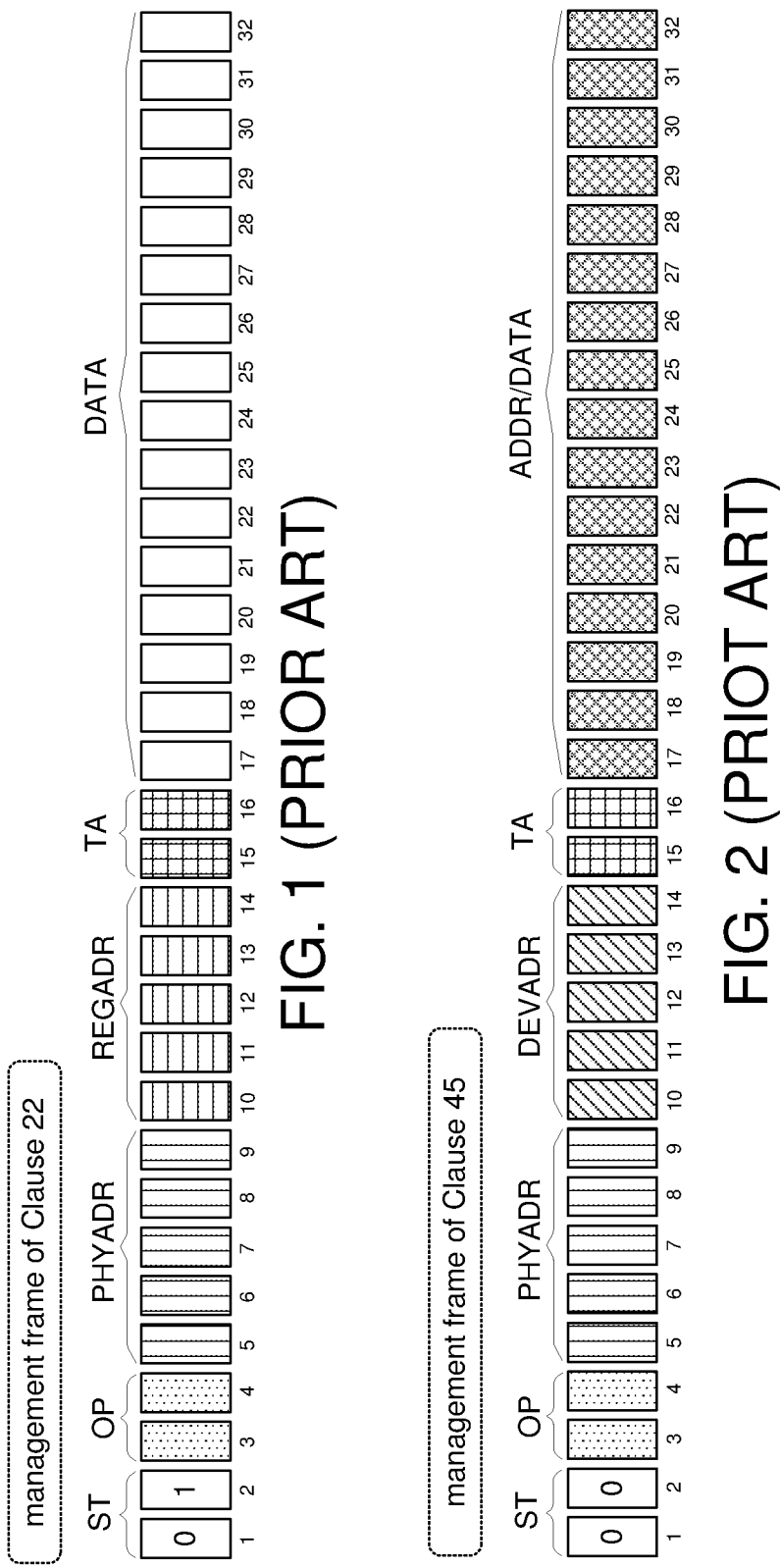

PHYSICAL LAYER MODULE AND NETWORK MODULE

This application claims the benefit of Taiwan application Serial No. 112112026, filed Mar. 29, 2023, the disclosure of which is incorporated by reference herein in its entirety.

TECHNICAL FIELD

The disclosure relates in general to a physical layer module and a network module, and more particularly to a physical layer module and a network module that meet Clause 22 of IEEE 802.3 standards and support the expanded number of physical layer devices.

BACKGROUND

Management Data Input/Output (MDIO), also known as Serial Management Interface (SMI), is defined as a communication interface between a media access control (MAC) and a port physical layer (PHY) in Gigabit Ethernet equipment.

Two types of devices are defined in the MDIO, namely station management entity (STA) as the master device and MDIO management device (MMD) as the slave device. The station management entity STA drives a management data clock (MDC) and initiates the MDIO connection. Generally, the station management entity STA is a portion of the MAC, and the MDIO management device MMD is a portion of the PHY The MDIO bus is a two-wire bus sequentially transmitting the MDC signal and the MDIO signal, respectively. The MDC signal is a unidirectional signal continuously driven by the station management entity STA, and the MDIO signal is a bidirectional signal whose transmission direction depends on the operation type, that is, READ operation or WRITE operation.

The MDIO signal was originally defined in Clause 22 of IEEE (Institute of Electrical and Electronics Engineers) 802.3. FIG. 1 is a schematic diagram showing the frame format of a management frame mngFRM22 according to Clause 22.

According to Clause 22, the frame format is composed of the following fields: an ST field (start of frame, 2 bits), an OP field (operation code, 2 bits), a PHYADR field (PHY address, 5 bits), a REGADR field (register address, 5 bits), a TA field (turnaround time, 2 bits) and a DATA field (data, 16 bits). Table 1 lists the field values of the MDIO signal during the READ operation and the WRITE operation performed between the MAC and the PHY

TABLE 1

| Read/write | MDIO frame field | | | | | | | |
|---|---|---|---|---|---|---|---|---|
| | PRE | ST | OP | PHYAD | REGAD | TA | DATA | IDLE |
| READ | 1...1 | 01 | 10 | AAAAA | RRRRR | Z0 | DDDDDDDDDDDDDDDD | Z |
| WRITE | 1...1 | 01 | 01 | AAAAA | RRRRR | 10 | DDDDDDDDDDDDDDDD | Z |

As shown in Table 1, when the MAC starts to send the management frame mngFRM22, a series of preamble bits PRE is output first, and then the ST field (ST=01) defined in Clause 22 follows. When the MAC performs the READ operation on the PHY, the OP field is set to 10 (OP=10). When the MAC performs the WRITE operation on the PHY, the OP field is set to 01 (OP=01). After the MAC transmits data to the PHY, the MDIO signal is set to a high-impedance state (Z) (IDLE status).

According to the definition of Clause 22, the PHYADR field has a length of 5 bits, and it represents that the MDIO interface supports up to 32 physical layer devices. Each of the 32 physical layer devices corresponds to a 5-bit access address. The PHY responds to the instruction from the MAC only when the PHYADR field is consistent with the access address of the PHY Because the supportable number (32) of the physical layer devices, as defined in Clause 22, is not enough, Clause 45 defines enhanced MDIO, and it supports up to 65536 physical layer devices. FIG. 2 is a schematic diagram showing the frame format of a management frame mngFRM45 according to Clause 45.

According to Clause 45, the frame format of the management frame mngFRM45 is composed of the following fields: an ST field (start of frame, 2 bits), an OP field (operation code, 2 bits), a PHYADR field (PHY address, 5 bits), a DEVADR field (device address, 5 bits), a TA field (turnaround time, 2 bits) and an ADDR field (address, 16 bits)/DATA field (data, 16 bits). Compared with Clause 22, Clause 45 uses the DEVADR field (device address) instead of the REGADR field (register address). According to the definition of Clause 22, a management frame mngFRM22 includes both the PHYADR field (PHY address) and the DATA field (data). According to Clause 45, the MAC can use an address frame to transmit the PHY address to the MDIO management device MMD and the registers first and then uses a management frame mngFRM45 to transmit the OP field (operation code: READ operation or WRITE operation) to the MDIO management device MMD.

In brief, Clause 22 and Clause 45 support different numbers of physical layer devices because Clause 22 and Clause 45 use fields having different lengths to store the access address of the physical layer device. Clause 22 uses the 5-bit PHYADR field to represent the access address of the physical layer device, while Clause 45 uses the 16-bit ADDR field to represent the access address of the physical layer device. Although Clause 45 can solve the problem of insufficient supportable physical layer devices according to Clause 22, the physical layer devices of Clause 22 can not interpret the address field of the MDIO signal of Clause 45 accurately.

SUMMARY

The disclosure is directed to a physical layer module and a network module meeting Clause 22 of IEEE 802.3 standards with the expanded number of physical layer devices.

According to one embodiment, a physical layer module is provided. The physical layer module is accessed by a media access control module via a management data input/output (MDIO) signal. The physical layer module includes a group decoder, an input selection module, and a device module. The group decoder decodes a common input data signal generated according to the MDIO signal to generate a group selection signal. The input selection module is electrically connected to the group decoder. The input selection module includes X input circuits classified into M groups. The X input circuits generate X device input data, respectively, according to the common input data signal and the group selection signal. The device module is electrically connected to the input selection module. The device module includes K physical layer devices classified into the M groups. The K physical layer devices receive the X device input data from the X input circuits, respectively. An m-th group among the M groups corresponds to at least one input circuit among the X input circuits and N[m] physical layer devices among the K physical layer devices. When the group selection signal designates the m-th group, the at least one input circuit corresponding to the m-th group outputs at least one device input data to the N[m] physical layer devices according to the common input data signal, and the group selection signal to make the N[m] physical layer devices selectively perform access operation according to the at least one device input data. Also, every input circuit, except the at least one input circuit, stops outputting corresponding device input data to disable remaining (K–N[m]) physical layer devices excluded in the m-th group. X, M, K, m, and N[m] are positive integers, K is greater than N[m], and m is smaller than or equivalent to M.

According to another embodiment, a network module is provided. The network module includes the physical layer module and a media access control module. The media access control module transmits or receives a management data input/output (MDIO) signal. The physical layer module is electrically connected to the media access control module. The physical layer module is accessed by the media access control module via a management data input/output (MDIO) signal.

BRIEF DESCRIPTION OF THE DRAWINGS

The advantages of the disclosure will become more readily apparent to those ordinarily skilled in the art after reviewing the following detailed description and accompanying drawings.

FIG. 1 (prior art) is a schematic diagram showing the frame format of a management frame mngFRM22 according to Clause 22.

FIG. 2 (prior art) is a schematic diagram showing the frame format of a management frame mngFRM45 according to Clause 45.

Figure 3:
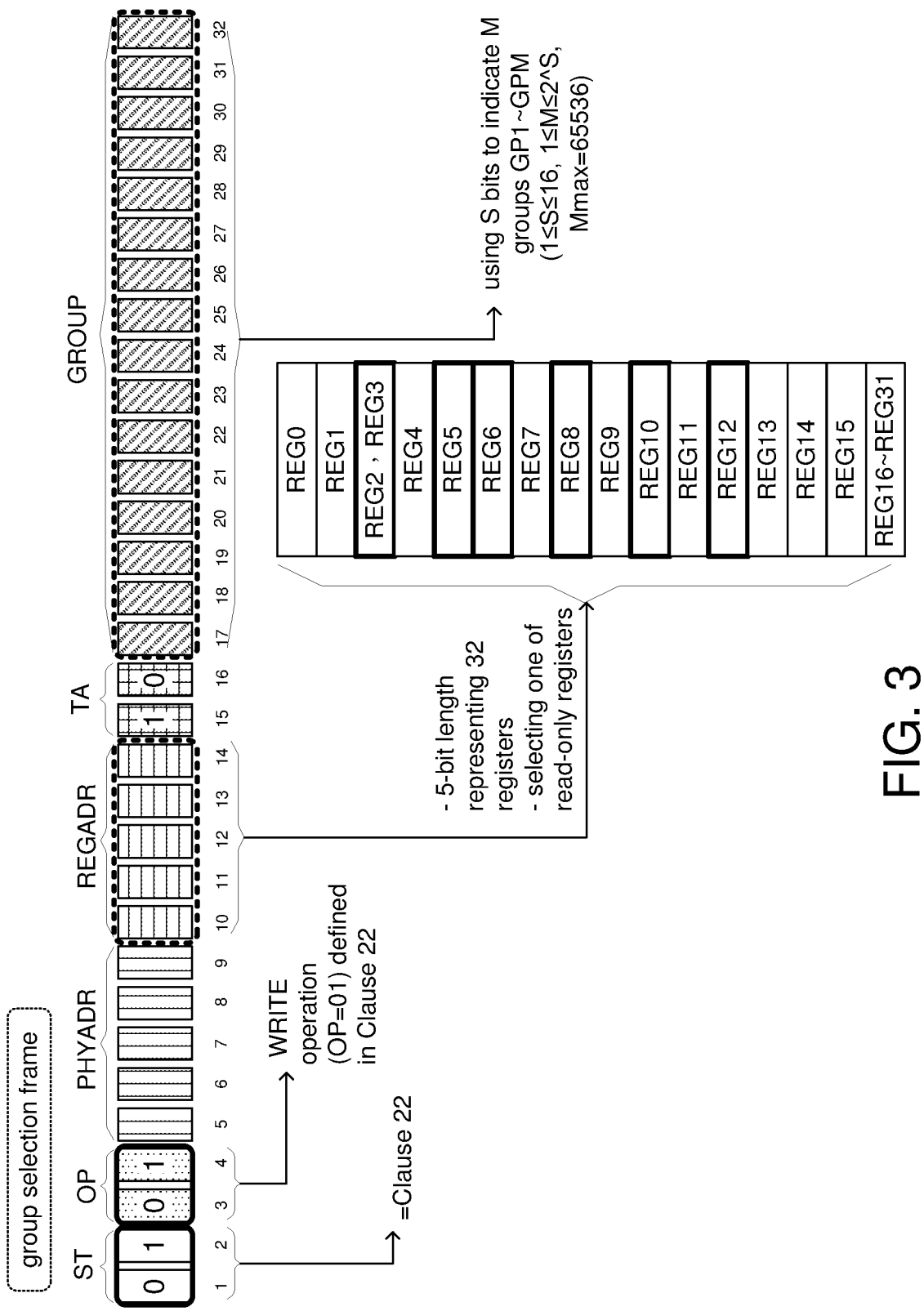
FIG. 3 is a schematic diagram showing the frame format of a group selection frame gpFRM according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 3 is a schematic diagram showing the frame format of a group selection frame gpFRM according to the disclosure. The group selection frame gpFRM, according to the disclosure, includes an ST field (start of frame, 2 bits), an OP field (operation code, 2 bits), a PHYADR field (PHY address, 5 bits), a REGADR field (register address, 5 bits), a TA field (turnaround time, 2 bits) and a GROUP field (group selection, 16 bits). In the group selection frame gpFRM, the TA field remains "0b10".

Please refer to FIG. 1 and FIG. 3 together. The fields of the group selection frame gpFRM of the disclosure are almost the same as the fields of the management frame mngFRM22 of Clause 22. The difference is that the last 16 bits of the group selection frame gpFRM are defined as the GROUP field (group selection), but the last 16 bits of the management frame mngFRM22 of Clause 22 are defined as the DATA field (data). In the group selection frame gpFRM, the OP field remains OP=01, that is, the WRITE operation indicated by the OP field of Clause 22. Furthermore, according to the concepts of the disclosure, the PHY does not interpret the PHYADR field of the group selection frame gpFRM. Therefore, the MAC can fill the 5-bit PHYADR field of the group selection frame gpFRM with any value.

In the group selection frame gpFRM, the REGADR field indicates a preselected register. The position (Bit 10-Bit 14) and the number (5) of bits of the REGADR field of the group selection frame gpFRM are similar to those of the REGADR field of the management frame mngFRM22 defined in Clause 22.

According to Clause 22, the REGADR field of the management frame mngFRM22 can address 32 registers (REG0~REG31). Among the 32 registers (REG0~REG31), the registers REG2, REG3, REG5, REG6, REG8, REG10 and REG12 are read-only registers. Table 2 shows the read-only registers of Clause 22.

TABLE 2

| Register | Register name | REGADR |
|---|---|---|
| REG2 | PHY identifier register | 0b 00010 |
| REG3 | | 0b 00011 |
| REG5 | Auto-negotiation link partner base page ability register | 0b 00101 |
| REG6 | Auto-negotiation expansion register | 0b 00110 |
| REG8 | Auto-negotiation link partner received next page register | 0b 01000 |
| REG10 | MASTER-SLAVE status register | 0b 01010 |
| REG12 | Power sourcing equipment (PSE) status register | 0b 01100 |

According to the concepts of the disclosure, when the station management entity STA outputs the group selection frame gpFRM, the OP field of the group selection frame gpFRM is set to the operation code corresponding to the WRITE operation (OP=01). Further, the station management entity STA sets the REGADR field of the group selection frame gpFRM to indicate at least one read-only register, for example, at least one of the PHY identifier register REG2 (REGADR=0b00010), the PHY identifier register REG3 (REGADR=0b00011), the auto-negotiation link partner base page ability register REG5 (REGADR=0b00101), the auto-negotiation expansion register REG6 (REGADR=0b00110), the auto-negotiation link partner received next page register REG8 (REGADR=0b01000), the MASTER-SLAVE status register REG10 (REGADR=0b01010) and the power sourcing equipment status register REG12 (REGADR=0b01100).

According to Clause 22, the read-only register only allows read access but not write access. In other words, in the management frame mngFRM22 of Clause 22, no read-only register REG is indicated in the REGADR field when the WRITE operation is indicated in the OP field (OP=01). Therefore, by setting the OP field to WRITE operation (OP=01) and setting the REGADR field to a read-only register, the MDIO management device MMD realizes that the current input frame inFRM output from the station management entity STA is a group selection frame gpFRM, but not a management frame mngFRM22 of Clause 22. Accordingly, the MDIO management device MMD will select one of the device access groups GP1~GPM, as designated by the GROUP field of the group selection frame gpFRM.

The group selection frame gpFRM of the disclosure has a format consistent (compatible) with the standards of Clause 22, except for the GROUP field. Further, the disclosure sets the OP field and the REGADR field of the group selection frame gpFRM wherein the setting is considered as a contradiction in Clause 22 so that the MDIO management device MMD can identify the specific information (that is, the GROUP field) carried by the group selection frame gpFRM.

Figure 4A:
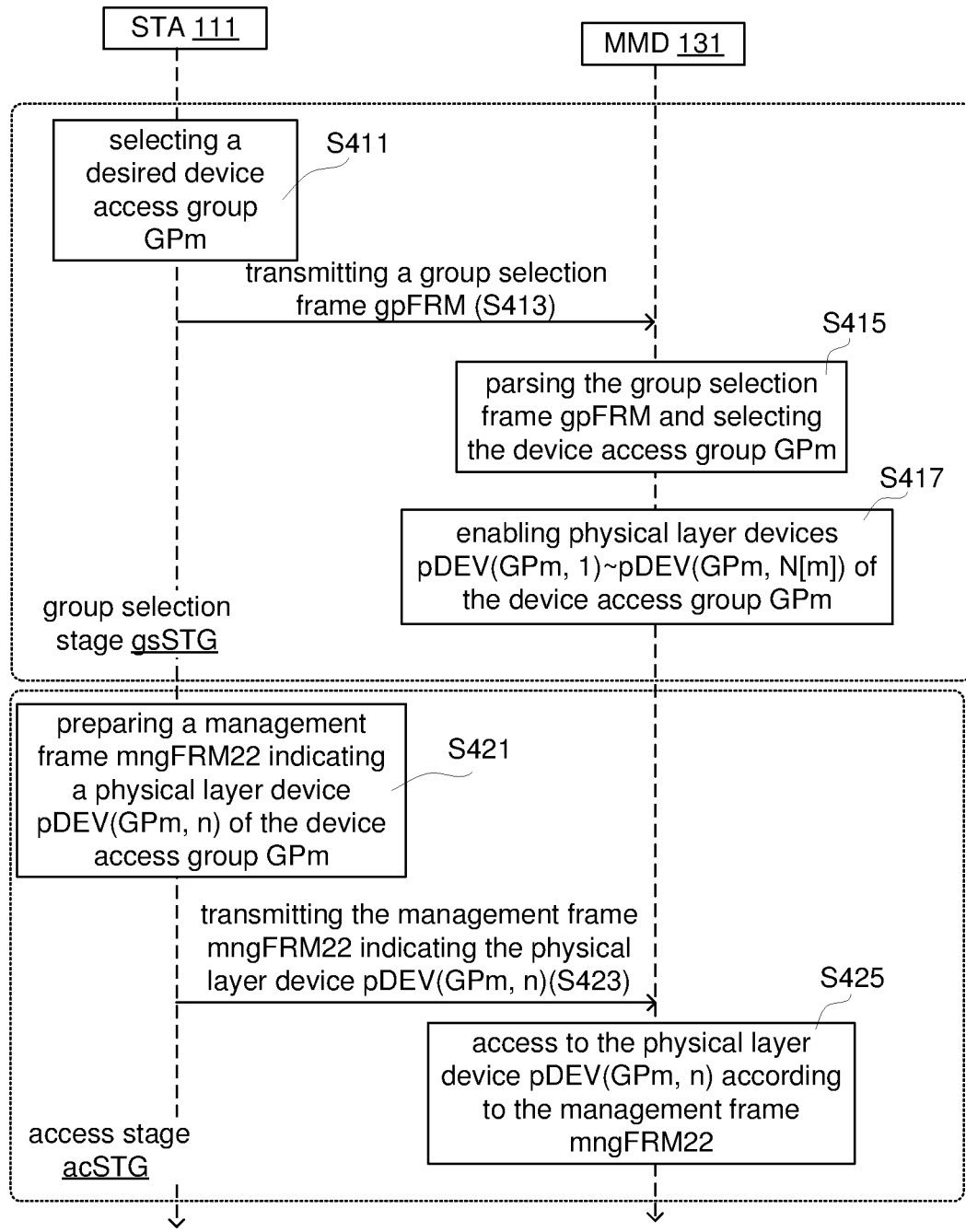
FIG. 4A is a sequence diagram illustrating MIDO communication between the station management entity STA and the MDIO management device MMD in the network module of the disclosure.

FIG. 4A is a sequence diagram illustrating MIDO communication between the station management entity STA and the MDIO management device MMD in the network module of the disclosure. In this diagram, the vertical lines going from top to bottom represent the sequence of the steps. The steps performed by the station management entity STA 111 are shown on the left in FIG. 4A, and the steps performed by the MDIO management device MMD 131 are shown on the right in FIG. 4A.

According to the concepts of the disclosure, the network module divides the MDIO communication procedure between the station management entity STA and the MDIO management device MMD into two stages: a group selection stage gsSTG, and an access stage acSTG. The network module enters the access stage acSTG after the group selection stage gsSTG is complete.

During the group selection stage gsSTG, the station management entity STA 111 designates a device access group GPm, including the selected physical layer device (Step S411), and transmits the group selection frame gpFRM (Step S413). Then, the MDIO management device MMD 131 parses the group selection frame gpFRM and selects the device access group GPm (Step S415). An input selection module enables the physical layer devices pDEV(GPm, 1)~pDEV(GPm, N[m]) of the device access group GPm (Step S417).

During the access stage acSTG, the station management entity STA 111 prepares and transmits the management frame mngFRM22 of Clause 22 to the N[m] physical layer devices pDEV(GPm, 1)~pDEV(GPm, N[m]) of the m-th device access group GPm (Step S421 and S423). The contents of the management frame mngFRM22 represent that the station management entity STA 111 selects the physical layer device pDEV(GPm, n) of the m-th device access group GPm to perform data access.

Subsequently, data access to the physical layer device pDEV(GPm, n) is performed according to the management frame mngFRM22 (Step S425). The physical layer device pDEV(GPm, n) includes a parser configured to parse the fields of the management frame mngFRM22 (see FIG. 1). After the parsing step, WRITE operation or READ operation is performed on the physical layer device pDEV(GPm, n) according to the OP field, or the internal register is read or set according to the REGADR field. The details of the operation and structure of the physical layer device pDEV (GPm, n) based on Clause 22 are not described herein.

According to the concepts of the disclosure, during the group selection stage gsSTG, the station management entity STA 111 transmits the group selection frame gpFRM as shown in FIG. 3. During the access stage acSTG, the station management entity STA 111 transmits the management frame mngFRM22 of Clause 22 as shown in FIG. 1. According to the concepts of the disclosure, only when the currently selected physical layer device pDEV and the next selected physical layer device pDEV, to be accessed by the station management entity STA 111, are included in different device access groups GP1~GPM, the station management entity STA 111 needs to transmit another (updated) group selection frame gpFRM to the MDIO management device MMD 131. When the station management entity STA 111 selects the current physical layer device and the next physical layer device in the same device access group GPm to perform the data access, the network module maintains to operate at the access stage acSTG. In other words, Steps S421, S423, and S425 could be repeated several times till the next cycle of steps S411, S413, S415, and S417 in practical applications.

Figure 4B:
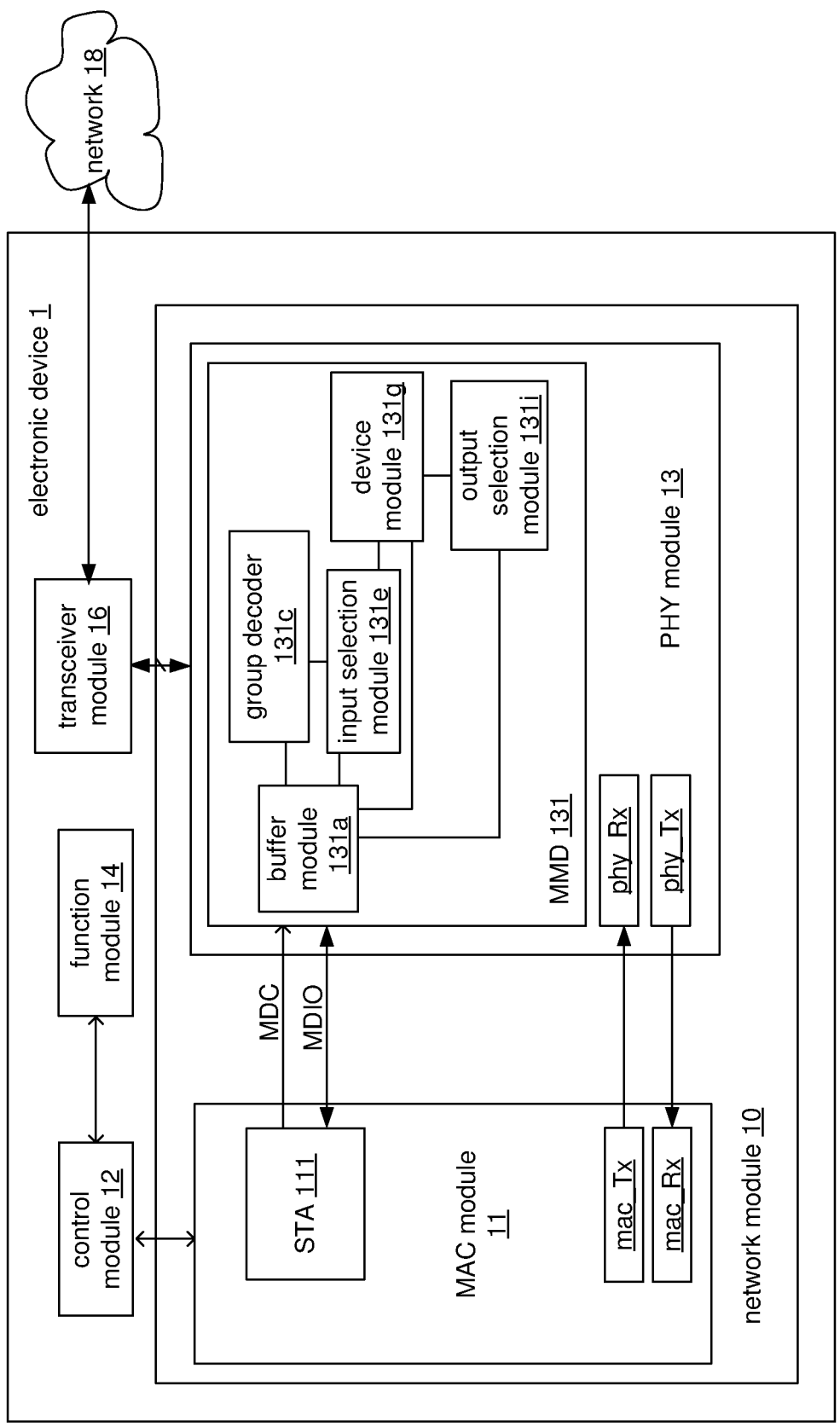
FIG. 4B is a block diagram illustrating an embodiment of an electronic device adopting the network module of the disclosure.

FIG. 4B is a block diagram illustrating an embodiment of an electronic device adopting the network module of the disclosure. The electronic device 1 includes a control module 12, a function module 14, a network module 10, and a transceiver module 16. The control module 12 is electrically connected to the function module 14 and the network module 10. The transceiver module 16 is electrically connected to the network module 10, and the transceiver module 16 is in communication with network 18. The control module 12 coordinates the operation of different modules, and the operation of the function module 14 depends on the applications of the electronic device 1.

The network module 10 includes a media access control (MAC) module 11 and a physical layer (PHY) module 13 electrically connected to each other. The MAC module 11 is electrically connected to the control module 12, and the PHY module 13 is electrically connected to the transceiver module 16. The MAC module 11 further includes a station management entity STA 111, a transmitter mac_Tx, and a receiver mac_Rx. The PHY module 13 further includes an MDIO management device MMD 131, a transmitter phy_Tx, and a receiver phy_Rx. The station management entity STA 111 and the MDIO management device MMD 131 are electrically connected to each other; the transmitter mac_Tx and the receiver phy_Rx are electrically connected to each other; and the receiver mac_Rx and the transmitter phy_Tx are electrically connected to each other.

For illustration purposes, the uppercase variables (for example, M, K, S, N[m] or X) represent the quantity of the components/signals, and the lowercase variables (for example, m, n) represent a designated one of specific components/signals. M, K, S, m, n, and N[m] are positive integers; m is smaller than or equivalent to M; n is smaller than or equivalent to N[m]; S is smaller than M; and M is smaller than K in the disclosure.

The station management entity STA 111 of the MAC module 11 and the MDIO management device MMD 131 of the PHY module 13 communicate with each other through a management data clock (MDC) signal and a management data input/output (MDIO) signal. The MDIO management device MMD 131 further includes a buffer module 131a, a group decoder 131c, an input selection module 131e, a device module 131g, and an output selection module 131i. The device module 131g includes K physical layer devices pDEV[1]~pDEV[K] complying with Clause 22, wherein K is a positive integer and $K \leq 2^{(16+5)}$.

According to the concepts of the disclosure, the K physical layer devices pDEV[1]~pDEV[K] are classified into M device access groups GP1~GPM. The device access groups GP1~GPM respectively include N[1]~N[M] physical layer devices, wherein K=N[1]+N[2]+ • • • +N[M]. Each of the device access groups GP1~GPM corresponds to a group access address designated by the GROUP field. The N[m] physical layer devices pDEV(GPm, 1)~pDEV(GPm, N[m]) of the same device access group GPm are distinguished by their PHY addresses as indicated by the PHYADR field. Among the N[m] physical layer devices pDEV (GPm, 1)~pDEV(GPm, N[m]) of the device access group GPm, only one physical layer device (for example, the physical layer device pDEV(GPm, n)) has the device address consistent with the PHYADR field. It means that the physical layer device pDEV(GPm, n) is the selected physical layer device.

Therefore, only the physical layer device pDEV(GPm, n) of the device access group GPm performs related operations according to the contents of the management frame mngFRM22. On the other hand, the device address of each of other (N[m]−1) physical layer devices pDEV (GPm, 1)~pDEV(GPm, (n−1)) and pDEV(GPm, (n+1))~pDEV(GPm, N[m]) of the same device access group GPm is inconsistent with the PHYADR field, and they will ignore or drop the contents of the management frame mngFRM22.

The PHYADR field has a length of 5, and thus, the number N[1]~N[M] of physical layer devices included in the corresponding device access group GP1~GPM is up to 32 ($2^5$=32). In practical applications, the maximum number N[1]~N[M] of the physical layer devices included in one device access group GP1~GPM depends on the applications. For example, the PHYADR field has a length of 5 bits, but the MAC module uses only 2 bits to cover the N[1]~N[M] physical layer devices in one device access group GP1~GPM. Thus, each device access group GP1~GPM can include up to 4 ($2^2$=4) physical layer devices.

Furthermore, the control mechanism could be simplified by setting that the device access groups GP1~GPM include an equal number of physical layer devices, that is, N[1]=N [2]= • • • =N[M]. Nevertheless, the device access groups GP1~GPM could include different numbers N[1]~N[M] of physical layer devices in practical applications.

For interpreting the group selection frame gpFRM output from the station management entity STA, the disclosure provides auxiliary circuits in the PHY module to support the use of the physical layer devices only compatible with Clause 22. The auxiliary circuits include a group decoder 131c, an input selection module 131e, and an output selection module 131i.

After the station management entity STA 111 transmits the input frame inFRM to the MDIO management device MMD 131, these auxiliary circuits determine whether the input frame inFRM is a group selection frame gpFRM or a management frame mngFRM22 of Clause 22. After the auxiliary circuits analyze the type of the input frame inFRM and determine that the input frame inFRM is a group selection frame gpFRM, it represents that the station management entity STA 111 intends to perform related operation on a physical layer device of one device access group GPm among the device access groups GP1~GPM. At this time, the auxiliary circuits enable the device access group GPm through group selection signals gsSIG[1]~gsSIG[S], and disable the device access groups GP1~GP(m−1), GP(m+1) ~GPM through the group selection signals gsSIG[1]~gsSIG [S].

After analyzing the type of the frame and determining that the input frame inFRM is a management frame mngFRM22, the auxiliary circuits transmit the input frame inFRM to the device module 131g. At this time, the physical layer devices pDEV(GPm, 1)~pDEV(GPm, N[m]) of the device access group GPm parse the input frame inFRM according to Clause 22, and determine whether to perform the operation as indicated by the input frame inFRM according to their parsing results. The details about how the physical layer devices pDEV(GPm, 1)~pDEV(GPm, N[m]) parse the input frame inFRM according to Clause 22 and determine whether to perform the indicated operation need not be described herein.

Because the MDIO management device MMD 131 can not predict the type of the input frame inFRM sent from the station management entity STA 111, the auxiliary circuits need to monitor the contents of the MDIO signal to determine the format of the input frame inFRM continuously so that the MDIO management device MMD 131 can take actions according to the type of the input frame inFRM in time. The following is an embodiment explaining how the auxiliary circuits monitor the contents of the MDIO signal and determine the format of the input frame inFRM. In this embodiment, the MDIO management device MMD 131 shown in FIG. 5 provides two device access groups GP1 and GP2, and each of the device access groups GP1 and GP2 includes two physical layer devices.

Figure 5:
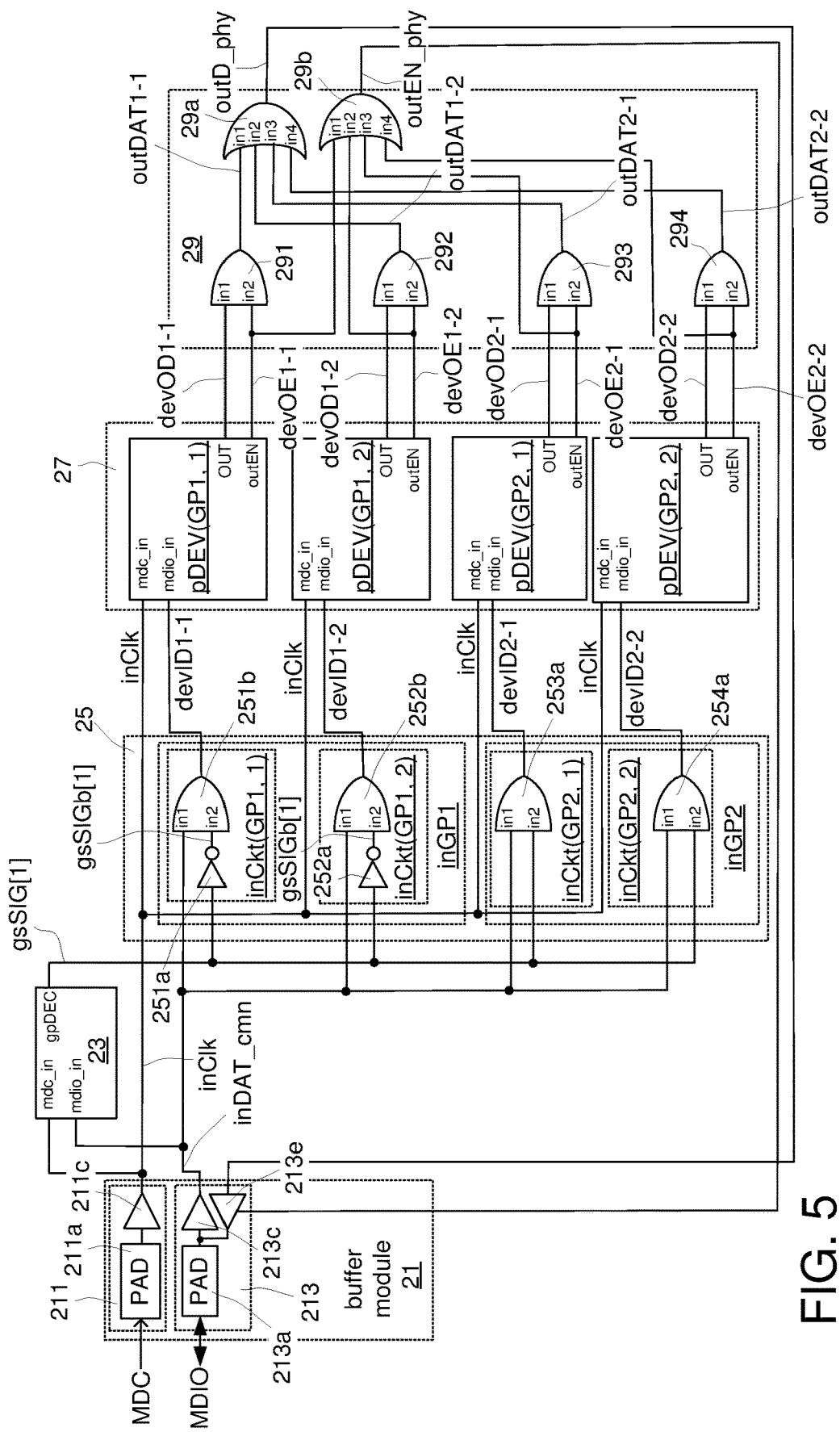
FIG. 5 is a schematic diagram showing that the MDIO management device MMD of the disclosure is classified into two device access groups GP1 and GP2, each of which includes two physical layer devices.

FIG. 5 is a schematic diagram illustrating the MDIO management device MMD of the disclosure. In this embodiment, it is supposed, for illustration purposes, that the MDIO management device MMD includes M=2 device access groups GP1 and GP2, and each device access group GP1, GP2 includes two physical layer devices (N[1]=N[2]=2). The internal components and the related connection of the buffer module 21, the group decoder 23, the input selection module 25, the device module 27, and the output selection module 29 will be described respectively based on the supposed condition. To describe the attributes and positions of the components and the signals in an efficient manner, coordinates (GPm, n) indicate the corresponding device access group (GPm) and the relative position (n) in the device access group. Sometimes, it is expressed with a hyphen such as GPm-n, wherein GPm represents that the component or signal corresponds to the device access group GP1 or GP2, and n represents that the component or signal corresponds to a specific physical layer device pDEV of the device access group.

The buffer module 21 includes buffer circuits 211 and 213. The buffer circuit 211 includes a pad 211a and a buffer gate 211c connected to each other. After the pad 211a receives the MDC signal from the station management entity STA, the buffer gate 211c transmits an input clock signal inClk to the group decoder 23 and the input selection module 25.

The buffer circuit 213 includes a pad 213a and buffer gates 213c and 213e. The pad 213a is electrically connected to an input terminal of the buffer gate 213c and an output terminal of the buffer gate 213e. The buffer circuit 213 transmits the MDIO signal to the station management entity STA, or receives the MDIO signal from the station management entity STA. An input terminal of the buffer gate 213e receives a physical layer output data outD_phy, and the buffer gate 213e is enabled or disabled according to a physical layer output enable signal outEN_phy. When the buffer gate 213e is enabled by the physical layer output enable signal outEN_phy, the pad 213a receives the output from the buffer gate 213e, and the buffer gate 213a transmits the MDIO signal to the station management entity STA. By contrast, when the buffer gate 213e is disabled by the physical layer output enable signal outEN_phy, the buffer circuit 213 receives the MDIO signal from the station management entity STA, and the buffer gate 213c outputs a common input data signal inDAT_cmn to the group decoder 23 and the input selection module 25.

The group decoder 23 has a clock input terminal mdc_in electrically connected to the buffer gate 211c and a data input terminal mdio_in electrically connected to the buffer gate 213c. Furthermore, a group selection output terminal gpDEC of the group decoder 23 generates S group selection signals gsSIG[1]~gsSIG[S]. Since it is supposed that M=2, one group selection signal gsSIG (S=1) is shown in FIG. 5. Table 3 summarizes the relation between the group selection signal gsSIG[1] provided by the group decoder 23 and the device access groups GP1 and GP2.

TABLE 3

| Device access group | Group decoder 23 Group selection signal gsSIG[1] | Input selection module 25 Input group inGP |
| --- | --- | --- |
| GP1 | 0 | inGP1 |
| GP2 | 1 | inGP2 |

The input selection module 25 includes input groups inGP1 and inGP2 corresponding to the device access groups GP1 and GP2, respectively. The input group inGP1 includes input circuits inCkt(GP1, 1) and inCkt(GP1, 2); and the input group inGP2 includes input circuits inCKT(GP2, 1) and inCkt(GP2, 2).

In the input group inGP1, the input circuit inCkt(GP1, 1) includes an inverter 251a and an input AND gate 251b, and the input circuit inCkt(GP1, 2) includes an inverter 252a and an input AND gate 252b. Both inverters 251a and 252a receive the group selection signal gsSIG[1] from the group decoder 23 and generate an inverted group selection signal gsSIGb[1]. Input terminals in1 of input AND gates 251b and 252b both receive the common input data signal inDAT_cmn from the buffer gate 213c, and input terminals in2 of the input AND gates 251b and 252b respectively receive the inverted group selection signal gsSIGb[1] from the inverters 251a and 252a. The input AND gate 251b performs AND operation on the input terminals in1 and in2 to generate a device input data devID1-1; and the input AND gate 252b performs AND operation on the input terminals in1 and in2 to generate a device input data devID1-2. The input circuits inCkt(GP1, 1) and inCkt(GP1, 2) have similar internal components (one input AND gate and one inverter, and the output terminal of the inverter is electrically connected to one input terminal of the input AND gate), and both the input circuits inCkt(GP1, 1) and inCkt(GP1, 2) receive the group selection signal gsSIG[1] and the common input data signal inDAT_cmn. Therefore, the device input data devID1-1 generated by the input circuit inCkt(GP1, 1) is substantially equivalent to the device input data devID1-2 generated by the input circuit inCkt(GP1, 2).

In the input group inGP2, the input circuit inCkt(GP2, 1) includes an input AND gate 253a, and the input circuit inCkt(GP2, 2) includes an input AND gate 254a. Input terminals in1 of both input AND gates 253a and 254a receive the common input data signal inDAT_cmn from the buffer gate 213c, and input terminals in2 of both input AND gates 253a and 254a receive the group selection signal gsSIG[1] from the group decoder 23. The input AND gate 253a performs AND operation on the input terminals in1 and in2 to generate the device input data devID2-1, and the input AND gate 254a performs AND operation on the input terminals in1 and in2 to generate the device input data devID2-2. The input circuits inCkt(GP2, 1) and inCkt(GP2, 2) have similar internal components (one input AND gate), and both receive the group selection signal gsSIG[1] and the common input data signal inDAT_cmn. Therefore, the device input data devID2-1 generated by the input circuit inCkt(GP2, 1) is substantially equivalent to the device input data devID2-2 generated by the input circuit inCkt(GP2, 2).

Table 4 further summarizes the internal components and the input/output signals corresponding to the device access groups GP1 and GP2 in the input selection module 25. In practical applications, the internal components of the input circuits inCkt and the number of group selection signals gsSIG[1]~gsSIG[S] depend on the connection between the input circuits inCkt and the group decoder 23 and are not limited to the embodiments.

TABLE 4

| | Input selection module 25 | | | |
| --- | --- | --- | --- | --- |
| Device access group | Input circuit inCkt | componentt of input circuit inCkt | Input signal | Output signal (=device input data devID) |
| GP1 | inCkt(GP1, 1) | 1 inverter | inDAT_cmn, gsSIG[1] | devID1-1 |
|  | inCkt(GP1, 2) | 1 input AND gate | | devID1-2 |
| GP2 | inCkt(GP2, 1) | 1 input AND gate | | devID2-1 |
|  | inCkt(GP2, 2) | | | devID2-2 |

The device module 27 includes the physical layer devices pDEV(GP1, 1), pDEV(GP1, 2), pDEV(GP2, 1) and pDEV(GP2, 2). The physical layer devices pDEV(GP1, 1), pDEV(GP1, 2), pDEV(GP2, 1), and pDEV(GP2, 2) are all physical layer devices designed based on Clause 22. The physical layer devices pDEV(GP1, 1)~pDEV(GP2, 2) have respective clock input terminals mdc_in, data input terminals mdio_in, data output terminals OUT, and output data enable terminals outEN.

The physical layer devices pDEV(GP1, 1) and pDEV(GP1, 2) correspond to the device access group GP1, and the physical layer devices pDEV(GP2, 1) and pDEV(GP2, 2) correspond to the device access group GP2. The clock input terminals mdc_in of all physical layer devices pDEV(GP1, 1), pDEV(GP1, 2), pDEV(GP2, 1) and pDEV(GP2, 2) receive the input clock signal inClk. The data input terminals mdio_in of the physical layer devices pDEV(GP1, 1), pDEV(GP1, 2), pDEV(GP2, 1), and pDEV(GP2, 2) are respectively electrically connected to the output terminals of the input circuits inCkt(GP1, 1), inCkt(GP1, 2), inCkt(GP2, 1) and inCkt(GP2, 2). The data output terminal OUT and the output data enable terminal outEN of the physical layer device pDEV(GP1, 1) are electrically connected to an output AND gate 291; the data output terminal OUT and the output data enable terminal outEN of the physical layer device pDEV(GP1, 2) are electrically connected to an output AND gate 292; the data output terminal OUT and the output data enable terminal outEN of the physical layer device pDEV (GP2, 1) are electrically connected to an output AND gate 293; and the data output terminal OUT and the output data enable terminal outEN of the physical layer device pDEV (GP2, 2) are electrically connected to an output AND gate 294.

According to the concepts of the disclosure, the WRITE operation (OP=01) or the READ operation (OP=10), as indicated by the OP field, will be performed by the physical layer device pDEV(GP1, 1), pDEV(GP1, 2), pDEV(GP2, 1) or pDEV(GP2, 2) according to the corresponding device access groups GP1 and GP2. The implementation of the WRITE operation (OP=01) and the READ operation (OP=10) are described below.

In the case that the station management entity STA will perform the WRITE operation (OP=01), if the field value of the GROUP field of the previously transmitted group selection frame gpFRM designates the device access group GP1, only the physical layer devices pDEV(GP1, 1) and pDEV (GP1, 2) belonging to the device access group GP1 receive the device input data devID1-1 and devID1-2; while the physical layer devices pDEV(GP2, 1) and pDEV(GP2, 2) belonging to the device access group GP2 are disabled (not receive the device input data devID2-1 and devID2-2). By contrast, in the case that the station management entity STA will perform the WRITE operation (OP=01) if the field value of the GROUP field of the previously transmitted group selection frame gpFRM designates the device access group GP2, the physical layer devices pDEV(GP1, 1) and pDEV (GP1, 2) belonging to the device access group GP1 are disabled (not receive the device input data devID1-1 and devID1-2); while only the physical layer devices pDEV (GP2, 1) and pDEV(GP2, 2) belonging the device access group GP2 receive the device input data devID2-1 and devID2-2.

In the case that the station management entity STA will perform the READ operation (OP=10), if the field value of the GROUP field of the previously transmitted group selection frame gpFRM designates the device access group GP1, among the physical layer devices pDEV(GP1, 1) and pDEV (GP1, 2) belonging to the device access group GP1, the output data enable terminal outEN of the physical layer device, whose device address is consistent with the PHYADR field, is set to 1 (outEN=1); and the output data enable terminal outEN of the other physical layer device, whose device address is inconsistent with the PHYADR field, is set to 0 (outEN=0). At this time, the output data enable terminals outEN of the physical layer devices pDEV(GP2, 1) and pDEV(GP2, 2) belonging to the device access group GP2 are set to 0 (outEN=0).

For example, if the field value of the GROUP field in the previously transmitted group selection frame gpFRM designates the device access group GP1, and the PHYADR field=0b00000, the output data enable terminal outEN of the physical layer device pDEV(GP1, 1) is set to 1 (outEN=1), and the output data enable terminal outEN of the physical layer device pDEV(GP1, 2) is set to 0 (outEN=0). At this time, the output data enable terminals outEN of both physical layer devices pDEV(GP2, 1) and pDEV(GP2, 2) belonging to the device access group GP2 are set to 0 (outEN=0).

Similarly, in the case that the station management entity STA will perform the READ operation (OP=10) if the field value of the GROUP field in the previously transmitted group selection frame gpFRM designates the device access group GP2, the output data enable terminals outEN of the physical layer devices pDEV(GP1, 1) and pDEV(GP1, 2) belonging to the device access group GP1 are set to 0 (outEN=0). At this time, among the physical layer devices pDEV(GP2, 1) and pDEV(GP2, 2) belonging to the device access group GP2, the output data enable terminal outEN of the physical layer device, whose device address is consistent with the PHYADR field, is set to 1 (outEN=1); and the output data enable terminal outEN of the other physical layer device, whose device address is inconsistent with the PHYADR field, is set to 0 (outEN=0).

According to the above descriptions, in the case that the station management entity STA will perform the READ operation, among the N[m] physical layer devices pDEV (GPm, 1)~pDEV(GPm, N[m]) included in the device access group GPm designated by the field value of the GROUP field, only one physical layer device pDEV(GPm, n) has its output data enable terminal outEN set to 1 (outEN=1), and the other (N[m]−1) physical layer devices pDEV(GPm, 1)~pDEV(GPm, n−1) and pDEV(GPm, n+1)~pDEV(GPm, N[m]) have their output data enable terminals outEN set to 0 (outEN=0). At this time, the output data enable terminals outEN of all of the (N[1]~N[m−1] and N[m+1]~N[M]) physical layer devices pDEV included in other (M−1) device access groups GP1~GP(m−1) and GP(m+1)~GPM which are not designated by the field value of the GROUP field are also set to 0 (outEN=0).

In other words, among the N[m] enabled physical layer devices pDEV(GPm, 1)~pDEV(GPm, N[m]) of the device access group GPm, only the physical layer device pDEV (GPm, n) whose device address is consistent with the field value of the PHYADR field of the management frame mngFRM22 is indeed selected by the station management entity STA. Then, the WRITE operation or READ operation indicated by the field value of the OP field will be performed on the selected physical layer device pDEV(GPm, n).

During the WRITE operation, the selected physical layer device pDEV(GPm, n) receives the field value of the DATA field of the management frame mngFRM22 from the station management entity STA through the data input terminal mdio_in. The other (K−1) unselected physical layer devices are classified into two types, according to their corresponding device access groups GP1~GPM, to receive different MDIO input signals mdio_in through respective data input terminals mdio_in.

In the first type, the unselected physical layer devices are the (K−N[m]) physical layer devices included in the device access groups GP1~GP(m−1) and GP(m+1)~GPM excluding the selected physical layer device pDEV(GPm, n). The MDIO input signals mdio_in received by the (K−N[m]) physical layer devices included in the undesignated device access groups GP1~GP(m−1) and GP(m+1)~GPM through respective data input terminals mdio_in remain at 0 (mdio_in=0). It means that the physical layer devices of this type are disabled.

In the second type, the unselected physical layer devices are the physical layer devices pDEV(GPm, 1)~pDEV(GPm, n−1) and pDEV(GPm, n+1)~pDEV(GPm, N[m]) included in the same device access group GPm including the selected physical layer device pDEV(GPm, n). The data input terminals mdio_in of the physical layer devices pDEV(GPm, 1)~pDEV(GPm, n−1) and pDEV(GPm, n+1)~pDEV(GPm, N[m]) included in the designated device access group GPm still receive the data content of the DATA field of the management frame mngFRM22 transmitted from the station management entity STA. Therefore, the unselected physical layer devices pDEV(GPm, 1)~pDEV(GPm, n−1) and pDEV(GPm, n+1)~pDEV(GPm, N[m]) included in the designated device access group GPm including the selected physical layer device pDEV(GPm, n) are still enabled. Nevertheless, the physical layer devices pDEV(GPm, 1)~pDEV(GPm, n−1) and pDEV(GPm, n+1)~pDEV(GPm, N[m]) in this type can interpret the PHYADR field. After comparing the PHYADR field and its (assigned) device address, any unselected physical layer device in this type realizes that the data content of the management frame mngFRM22 is unrelated to itself and will not continue in the later process.

During the READ operation, the selected physical layer device pDEV(GPm, n) uses the DATA field of the management frame mngFRM22 to transmit data to the station management entity STA through the data output terminal OUT. At the same time, the output data enable terminals outEN of all of the unselected (N[m]−1) physical layer devices included in the designated device access group GPm, including the selected physical layer device pDEV(GPm, n), are set to 0. Thus, the output AND gates connected to these unselected (N[m]−1) physical layer devices remain the output "0" and do not affect the output of the OR gate 29a. On the other hand, the (K−N[m]) unselected physical layer devices included in the device access groups GP1~GP(m−1) and GP(m+1)~GPM other than the designated device access group including the selected physical layer device pDEV(GPm, n) are not enabled. Therefore, the output data enable terminals outEN of the (K−N[m]) unselected physical layer devices included in the device access groups GP1~GP(m−1) and GP(m+1)~GPM are floating. Hence, the data content of the physical layer output data outD_phy is determined by only the physical layer device pDEV(GPm, n) with the output data enable terminal outEN set to 1. The data output terminals OUT of other (K−1) unselected physical layer devices do not affect the data content of the physical layer output data outD_phy.

Table 5 further summarizes the physical layer devices pDEV(GP1, 1)~pDEV(GP2, 2) and the input/output signals corresponding to the device access groups GP1 and GP2 in the device module 27.

TABLE 5

| | | | Input signal | | Output signal | |
|---|---|---|---|---|---|---|
| Device access group | Physical layer device pDEV(GPm, n) | | mdio_in = device input data | mdc_in | outEN = devOEm-n | Out = devODm-n |
| GP1 | pDEV(GP1, 1) | Input | devID1-1 | | devOE1-1 | devOD1-1 |
| | pDEV(GP1, 2) | clock | devID1-2 | | devOE1-2 | devOD1-2 |
| GP2 | pDEV(GP2, 1) | signal | devID2-1 | | devOE2-1 | devOD2-1 |
| | pDEV(GP2, 2) | inClk | devID2-2 | | devOE2-2 | devOD2-2 |

The output selection module 29 includes output AND gates 291, 292, 293, and 294 and OR gates 29a and 29b. The output AND gates 291, 292, 293, and 294, respectively, correspond to the physical layer devices pDEV(GP1, 1), pDEV(GP1, 2), pDEV(GP2, 1), and pDEV(GP2, 2). Both the OR gates 29a and 29b correspond to all of the physical layer devices pDEV(GP1, 1), pDEV(GP1, 2), pDEV(GP2, 1) and pDEV(GP2, 2). The connections between the output AND gates 291, 292, 293, 294 and the OR gates 29a, 29b are described below.

From the physical layer device pDEV(GP1, 1), the input terminals in1 and in2 of the output AND gate 291, respectively, receive the original device output data devOD1-1 generated at the data output terminal OUT and the device output enable signal devOE1-1 generated at the output data enable terminal outEN. The output AND gate 291 performs AND operation on the signals received at the input terminals in1 and in2. The output AND gate 291 generates and transmits the enabled device output data outDAT1-1 to the input terminal in1 of the OR gate 29a. In the case of the device output enable signal devOE1-1=1, the enabled device output data outDAT1-1 obtained from the AND operation is equivalent to the original device output data devOD1-1 output from the physical layer device pDEV(GP1, 1) (outDAT1-1=devOD1-1). In the case of the device output enable signal devOE1-1=0, the enabled device output data outDAT1-1 obtained from the AND operation remains at 0 (outDAT1-1=0).

From the physical layer device pDEV(GP1, 2), the input terminals in1 and in2 of the output AND gate 292, respectively, receive the original device output data devOD1-2 generated at the data output terminal OUT and the device output enable signal devOE1-2 generated at the output data enable terminal outEN. The output AND gate 292 performs AND operation on the signals received at the input terminals in1 and in2. The output AND gate 292 generates and transmits the enabled device output data outDAT1-2 to the input terminal in2 of the OR gate 29a. In the case of the device output enable signal devOE1-2=1, the enabled device output data outDAT1-2 obtained from the AND operation is equivalent to the original device output data devOD1-2 output from the physical layer device pDEV(GP1, 2) (outDAT1-2=devOD1-2). In the case of the device output enable signal devOE1-2=0, the enabled device output data outDAT1-2 obtained from the AND operation remains at 0 (outDAT1-2=0).

From the physical layer device pDEV(GP2, 1), the input terminals in1 and in2 of the output AND gate 293, respectively, receive the original device output data devOD2-1 generated at the data output terminal OUT and the device output enable signal devOE2-1 generated at the output data enable terminal outEN. The output AND gate 293 performs AND operation on the signals received at the input terminals in1 and in2. The output AND gate 293 generates and transmits the enabled device output data outDAT2-1 to the input terminal in3 of the OR gate 29a. In the case of the device output enable signal devOE2-1=1, the enabled device output data outDAT2-1 obtained from the AND operation is equivalent to the original device output data devOD2-1 output from the physical layer device pDEV(GP2, 1) (outDAT2-1=devOD2-1). In the case of the device output enable signal devOE2-1=0, the enabled device output data outDAT2-1 obtained from the AND operation remains at 0 (outDAT2-1=0).

From the physical layer device pDEV(GP2, 2), the input terminals in1 and in2 of the output AND gate 294, respectively, receive the original device output data devOD2-2 generated at the data output terminal OUT and the device output enable signal devOE2-2 generated at the output data enable terminal outEN. The output AND gate 294 performs AND operation on the signals received at the input terminals in1 and in2. The output AND gate 294 generates and transmits the enabled device output data outDAT2-2 to the input terminal in4 of the OR gate 29a. In the case of the device output enable signal devOE2-2=1, the enabled device output data outDAT2-2 obtained from the AND operation is equivalent to the original device output data devOD2-2 output from the physical layer device pDEV(GP2, 2) (outDAT2-2=devOD2-2). In the case of the device output enable signal devOE2-2=0, the enabled device output data outDAT2-2 obtained from the AND operation remains at 0 (outDAT2-2=0).

The input terminals in1, in2, in3, and in4 of the OR gate 29a receive the enabled device output data outDAT1-1, outDAT1-2, outDAT2-1, and outDAT2-2 generated by the output AND gates 291, 292, 293 and 294, respectively. The output terminal of the OR gate 29a is electrically connected to the buffer gate 213e. The OR gate 29a performs OR operation on the enabled device output data outDAT1-1, outDAT1-2, outDAT2-1, and outDAT2-2 to generate the physical layer output data outD_phy as the input of the buffer gate 213e.

The input terminals in1, in2, in3, and in4 of the OR gate 29b receive the device output enable signals devOE1-1, devOE1-2, devOE2-1 and devOE2-2 generated by the physical layer devices pDEV(GP1, 1), pDEV(GP1, 2). pDEV(GP2, 1) and pDEV(GP2, 2), respectively. The output terminal of the OR gate 29b is electrically connected to the buffer gate 213e. The OR gate 29b performs OR operation on the device output enable signals devOE1-1, devOE1-2, devOE2-1, and devOE2-2 to generate the physical layer output enable signal outEN_phy for enabling or disabling the buffer gate 213e. Table 6 further lists the internal components and signals corresponding to the device access groups GP1 and GP2 in the output selection module 29.

devices pDEV(GP1, 1)~pDEV(GPM, N[M]) through the K input terminals in1~inK, respectively, and then generates the physical layer output enable signal outEN_phy. According to the descriptions of FIG. 5, the physical layer output enable signal outEN_phy generated by the OR gate is equivalent to 1 when any one of the device output enable signals devOE1-1~devOEM-N[M] generated by the physical layer devices pDEV(GP1, 1)~pDEV(GPM, N[M]) is equivalent to 1. At this time, the buffer gate 231e in the buffer module 21 is enabled by the physical layer output enable signal outEN_phy, and the buffer module 21 outputs the MDIO signal.

Please refer to FIG. 3 again. In practical applications, if there are M device access groups GP1~GPM and the GROUP field is represented by S bits to designate the device access groups GP1~GPM, it is obtained that $1 \leq S \leq 16$ and $1 \leq M \leq 2^S$. In the case of S=1, the MAC module can set the field value of the GROUP field to 0x0 or 0x1. At this time, the MDIO management device MMD can provide $M=2^S=2^1=2$ device access groups. In another embodiment, in the case of S=16, the field value of the GROUP field can be 0x0~0xFFFF. At this time, the MDIO management device MMD can provide $M=2^S=2^{16}=65536$ device access groups.

In practical applications, the MAC module can decide the field value of the GROUP field according to the quantity (M) of the device access groups GP1~GPM. For example, in the

TABLE 6

| | Output selection module | | | | | | |
|---|---|---|---|---|---|---|---|
| | Output AND gate | | | OR gate 29a | | OR gate 29b | |
| GPm | Input in1 = original device output data devODm-n | Input in2 = device output enable signal devOEm-n | Output = enabled device output data outDATm-n | Input = enabled device output data outDATm-n | Output | Input = device output enable signal devOEm-n | Output |
| GP1 | devOD1-1 | devOE1-1 | outDAT1-1 | in1 = outDAT1-1 | Physical layer output data outD_phy | in1 = devOE1-1 | Physical layer output enable signal outEN_phy |
|  | devOD1-2 | devOE1-2 | outDAT1-2 | in2 = outDAT1-2 |  | in2 = devOE1-2 |  |
| GP2 | devOD2-1 | devOE2-1 | outDAT2-1 | in3 = outDAT2-1 |  | in3 = devOE2-1 |  |
|  | devOD2-1 | devOE2-1 | outDAT2-2 | in4 = outDAT2-2 |  | in4 = devOE2-2 |  |

It is derived from the embodiment with reference to FIG. 5 that the output selection module includes K output AND gates and two OR gates in practical applications. The input terminals in1 of the K output AND gates receive respective original device output data devOD1-1~devODM-N[M] from respective physical layer devices pDEV(GP1, 1)~pDEV(GPM, N[M]), and the input terminals in2 of the K output AND gates receive respective device output enable signals devOE1-1~devOEM-N[M] from respective physical layer devices pDEV(GP1, 1)~pDEV(GPM, N[M]).

Each of the two OR gates of the output selection module 29 has K input terminals in1~inK. One OR gate receives the output from the K output AND gates through the K input terminals in1~inK, respectively, and then generates the physical layer output data outD_phy. It is obtained from the description of FIG. 5 that the physical layer output data outD_phy generated by the OR gate changes with the original device output data devODm-n output from the selected physical layer device pDEV(GPm, n).

The other OR gate receives the device output enable signals devOE1-1~devOEM-N[M] from the physical layer case of S=1, the MAC module may keep the field value of the GROUP field to be 0x0. That is, the MAC module never sets the field value of the GROUP field to 0x1. At this time, the MDIO management device MMD provides only M=1 device access group GP1.

Similarly, in the case of S=3, M has a value up to $2^3=8$. It is possible that the MDIO management device MMD can provide only M=6 device access groups GP1~GP6. In this case, the MAC module can limit the field value of the GROUP field within the range of 0x~0x5 to selectively access M=6 device access groups GP1~GP6 of the MDIO management device MMD.

It is to be noted that when S<16, the positions of the S bits in the GROUP field are not limited. The only condition is that the MAC module and the PHY module have consistent settings. For example, in the case of S=1, the most significant bit (MSB) or the least significant bit (LSB) of the GROUP field can be used to designate the device access group. Such modification needs not be described herein.

Herein, the variable m represents a specific device access group GPm, wherein $1 \leq m \leq M$. Further, the device access group GPm may include N[m] physical layer devices pDEV. The number N[m] of the physical layer devices included in the device access group GPm depends on the number of actually-used bits in the PHYADR field for addressing the physical layer devices.

Because the PHYADR field has a length of 5 bits, the number N[m] of the physical layer devices included in the device access group GPm has a maximum of 32 ($2^5$=32). Nevertheless, in practical applications, the number N[m] of the physical layer devices included in the device access group GPm can be decided in circuit design by fully considering the number of the physical layer devices (pDEV[1]~pDEV[K]) of the MDIO management device MMD, the number (M) of the device access groups GP1~GPM and the overall circuit layout. In the embodiment with reference to FIG. 5, both the numbers N[1] and N[2] of the physical layer devices included in the device access groups GP1 and GP2 are equivalent to 2, that is, N[1]=N[2]=2. Please note that different device access groups GP1 and GP2 could include different numbers N[1] and N[2] of the physical layer devices.

Please refer to the condition that the group decoder 23 transmits the group selection signal gsSIG[1]=1. In the case of the group selection signal gsSIG[1]=1, the input terminals in2 of the input AND gates 251b and 252b in the input circuits inCkt(GP1, 1) and inCkt(GP1, 2) corresponding to the device access group GP1 are equivalent to 0 (in2=0). Therefore, the MDIO input signals mdio_in received by the physical layer devices pDEV(GP1, 1) and pDEV(GP1, 2) through the data input terminals mdio_in remain 0 (mdio_in=0). Hence, in the case of the group selection signal gsSIG[1]=1, the data output terminals OUT of the physical layer devices pDEV(GP1, 1) and pDEV(GP1, 2) are not changed with the common input data signal inDAT_cmn. Thus, the physical layer devices pDEV(GP1, 1) and pDEV(GP1, 2) are disabled.

On the other hand, in the case of the group selection signal gsSIG[1]=1, the input terminals in2 of the input AND gates 253a and 254a of the input circuits inCkt(GP2, 1) and inCkt(GP2, 2) corresponding to the device access group GP2 are equivalent to 1 (in2=1). Therefore, the device input data devID2-1 and devID2-2 depend on the common input data signal inDAT_cmn received at the input terminals in1. Also, the MDIO input signals mdio_in transmitted to the physical layer devices pDEV(GP2, 1) and pDEV(GP2, 2) are equivalent to the common input data signal inDAT_cmn (mdio_in=inDAT_cmn). Hence, in the case of the group selection signal gsSIG[1]=1, the data output terminals OUT of the physical layer devices pDEV(GP2, 1) and pDEV(GP2, 2) are changed with the common input data signal inDAT_cmn. Thus, the physical layer devices pDEV(GP2, 1) and pDEV(GP2, 2) are enabled.

Please further refer to the condition that the group decoder 23 transmits the group selection signal gsSIG[1]=0. In the case of the group selection signal gsSIG[1]=0, the input terminals in2 of the input AND gates 251b and 252b in the input circuits inCkt(GP1, 1) and inCkt(GP1, 2) corresponding to the device access group GP1 are equivalent to 1 (in2=1). Therefore, the device input data devID1-1 and devID1-2 depend on the common input data signal inDAT_cmn received at the input terminals in1. Also, the MDIO input signals mdio_in transmitted to the physical layer devices pDEV(GP1, 1) and pDEV(GP1, 2) are equivalent to the common input data signal inDAT_cmn (mdio_in=inDAT_cmn). Hence, in the case of the group selection signal gsSIG[1]=0, the data output terminals OUT of the physical layer devices pDEV(GP1, 1) and pDEV(GP1, 2) are changed with the common input data signal inDAT_cmn. Thus, the physical layer devices pDEV(GP1, 1) and pDEV(GP1, 2) are enabled.

On the other hand, in the case of the group selection signal gsSIG[1]=0, the input terminals in2 of the input AND gates 253a and 254a of the input circuits inCkt(GP2, 1) and inCkt(GP2, 2) corresponding to the device access group GP2 are equivalent to 0 (in2=0). Therefore, the MDIO input signals mdio_in received by the physical layer devices pDEV(GP2, 1) and pDEV(GP2, 2) remains 0 (mdio_in=0). Hence, in the case of the group selection signal gsSIG[1]=0, the data output terminals OUT of the physical layer devices pDEV(GP2, 1) and pDEV(GP2, 2) are not changed with the common input data signal inDAT_cmn. Thus, the physical layer devices pDEV(GP2, 1) and pDEV(GP2, 2) are disabled.

As described above, the group selection signal gsSIG[1] can selectively enable or disable the device access groups GP1 and GP2. When the device access group GP1 is enabled by the group selection signal gsSIG[1], the device access group GP2 is disabled by the group selection signal gsSIG[1], and vice versa. Accordingly, the physical layer devices included in the device access group disabled by the group selection signal gsSIG[1] will not perform any operation indicated by the management frame mngFRM22 transmitted from the MAC module 11 later.

In this embodiment, it is supposed that there are two device access groups GP1~GPM (M=2). Hence, the group selection signal gsSIG[1] is transmitted through only one signal line (S=1). If more device access groups GP1~GPM are provided, more bits (S) for the group selection signals gsSIG[1]~gsSIG[S] are required (1≤S≤16). The bit number (S) of the group selection signals gsSIG[1]~gsSIG[S] could be expressed as S=ceil($\log_2$(M)). For example, when there are M=13 device access groups GP1~GPM, the group decoder 23 need S=ceil($\log_2$(13))=ceil(3.7)=4 bits for the group selection signals gsSIG[1]~gsSIG[S]. From the above calculation, the variables S and M are satisfied with $2^S$≥M.

It is observed from FIG. 5 that the internal circuits and the signals received at the input terminals of the input circuits inCkt(GP1, 1) and inCkt(GP1, 2) corresponding to the device access group GP1 are the same, and the internal circuits and the signals received at the input terminals of the input circuits inCkt(GP2, 1) and inCkt(GP2, 2) corresponding to the device access group GP2 are the same. Therefore, the design could be simplified by disposing only one input circuit inCkt in one input group inGP. For example, only the input circuit inCkt(GP1) is disposed in the input group inGP1. Also, all the physical layer devices pDEV(GP1, 1)~pDEV(GP1, N[1]) included in the device access group GP1 corresponding to the input group inGP1 are commonly electrically connected to the input circuit inCkt(GP1) of the input group inGP1, as shown in FIG. 6.

Figure 6:
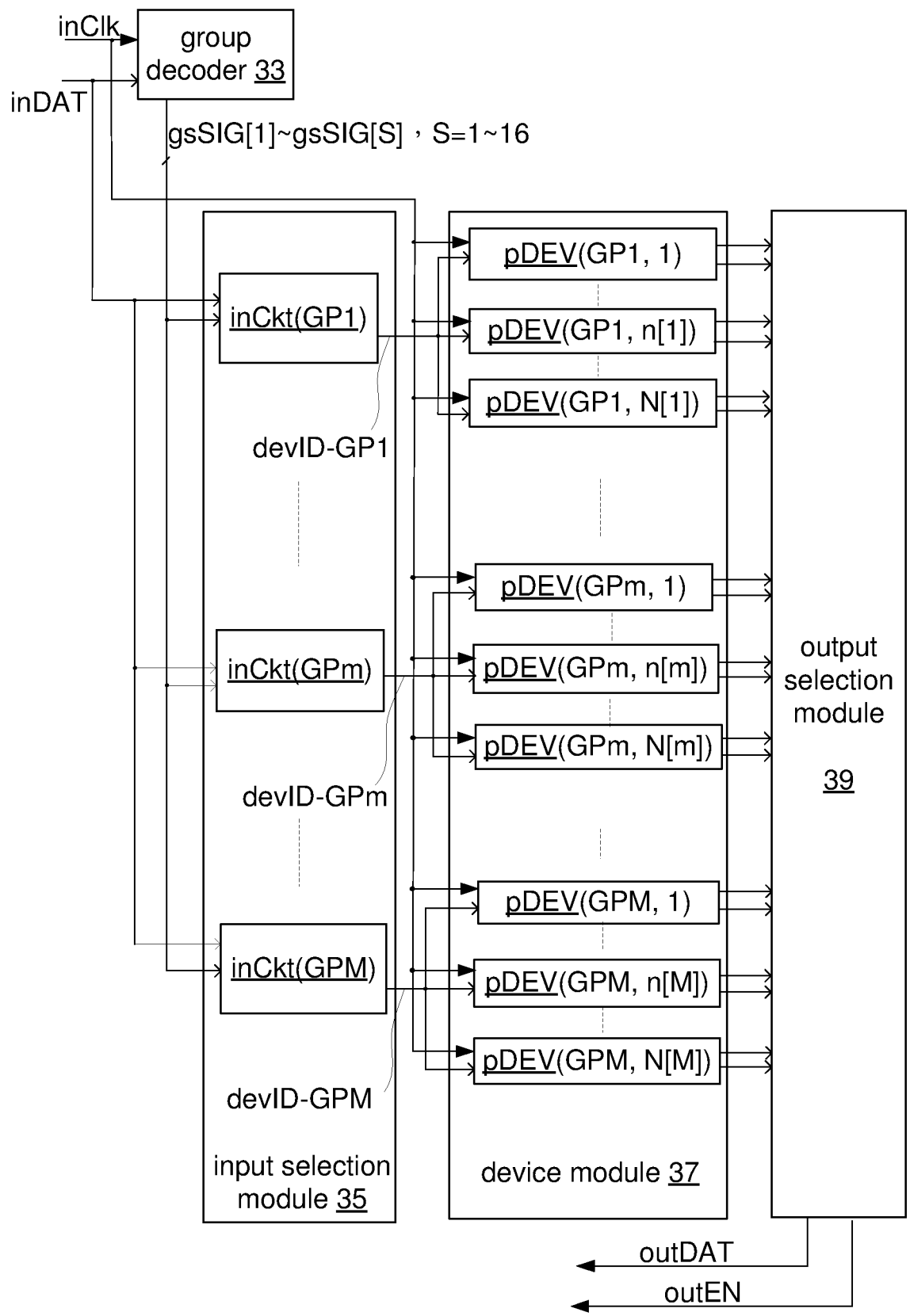
FIG. 6 is a schematic diagram illustrating another embodiment of the MDIO management device MMD according to the disclosure.

FIG. 6 is a schematic diagram illustrating another embodiment of the MDIO management device MMD according to the disclosure. The MDIO management device MMD includes a buffer module, a group decoder 33, an input selection module 35, a device module 37, and an output selection module 39. In this diagram, the structures of the group decoder 33, the device module 37, and the output selection module 39 are similar to those shown in FIG. 5, and are not repeated herein. On the other hand, in this diagram, the input selection module 35 only includes M input circuits inCkt(GP1)~inCkt(GPM). In other words, each of the input groups inGP1~inGPM includes only one input circuit inCkt(GP1)~inCkt(GPM).

As shown in FIG. 6, the input circuit inCkt(GP1) generates the device input data devID-GP1 according to the input clock signal inClk, common input data signal inDAT and the group selection signals gsSIG[1]~gsSIG[S]. Also, the input circuit inCkt(GP1) further provides the device input data devID-GP1 as the MDIO input signals mdio_in to the N[1] physical layer devices pDEV(GP1, 1)~pDEV(GP1, N[1]) of the device access group GP1.

Similarly, the input circuit inCkt(GPm) generates the device input data devID-GPm according to the input clock signal inClk, the common input data signal inDAT, and the group selection signals gsSIG[1]~gsSIG[S]. Also, the input circuit inCkt(GPm) further provides the device input data devID-GPm as the MDIO input signals mdio_in to the N[m] physical layer devices pDEV(GPm, 1)~pDEV(GPm, N[m]) in the device access group GPm. The design related to the input circuits inCkt(GP1), inCkt(GPm), and inCkt(GPM) could derived from the description with reference to FIG. 5, and a detailed description is omitted.

As described above, the number (X) of the input circuits included in the input selection module has a minimum of M (as shown in FIG. 6, corresponding to the M device access groups GP1~GPM) and a maximum of K (as shown in FIG. 5, corresponding to the physical layer devices pDEV[1]~pDEV[K]), wherein X is a positive integer. In practical applications, it is possible that each of some input groups includes only one input circuit, and each of the other input groups includes more than one input circuit (for example, equivalent to the number of the physical layer devices). Thus, it is obtained that M≤X≤K.

Figure 7:
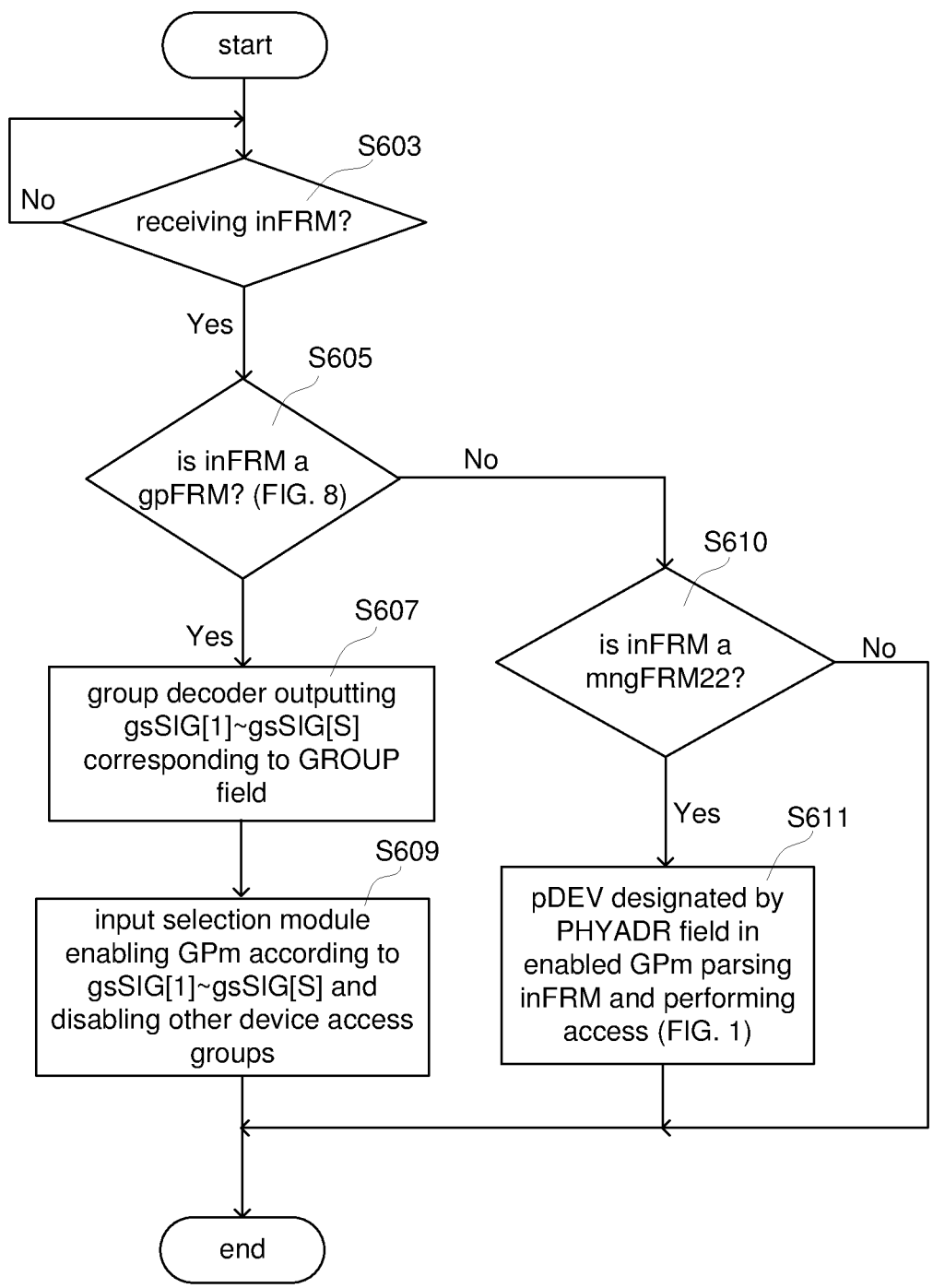
FIG. 7 is a flowchart showing the operation of the MDIO management device MMD according to the disclosure.

FIG. 7 is a flowchart showing the operation of the MDIO management device MMD according to the disclosure. At first, the MDIO management device MMD determines whether an input frame inFRM is received (Step S603). If the determination result of step S603 is negative, the process repeats the step detection till an input frame inFRM is detected. If the determination result of step S603 is positive, the group decoder 131c further determines whether the input frame inFRM is a group selection frame gpFRM (Step S605).

If the determination result of step S605 is positive, the group decoder 131c outputs the group selection signals gsSIG[1]~gsSIG[S] corresponding to the GROUP field (Step S607). Then, the input selection module 131e enables the device access group GPm designated by the GROUP field according to the group selection signals gsSIG[1]~gsSIG[S], and disables the N[1]~N[m−1] and N[m+1]~N[M] (that is, K−N[m]) physical layer devices included in the other (M−1) device access groups GP1~GP(m−1) and GP(m+1)~GPM (Step S609).

Step S609 is described in more detail with reference to the embodiment shown in FIG. 5. In FIG. 5, in the case of the group selection signal gsSIG[1]=0, the inverted group selection signal gsSIGb[1]=1 is generated. At this time, the output of the input AND gates 251b and 252b changes with the common input data signal inDAT_cmn received at the input terminals in1 because of the input terminal in2=1; also, the output of the input AND gates 253a and 254a remains 0 because of the input terminals in2=0. Therefore, the device input data devID1-1 and devID1-2 corresponding to the device access group GP1 and output from the input AND gates 251b and 252b are changed with the common input data signal inDAT_cmn. On the other hand, the device input data devID2-1 and devID2-2 corresponding to the device access group GP2 and output from the input AND gates 253a and 254a remain 0 (devID2-1=devID2-2=0).

Hence, the MDIO input signals mdio_in provided for the physical layer devices pDEV(GP1, 1) and pDEV(GP1, 2) of the device access group GP1 are equivalent to the common input data signal inDAT_cmn (mdio_in=inDAT_cmn). Thus, the physical layer devices pDEV(GP1, 1) and pDEV(GP1, 2) of the device access group GP1 can selectively perform related operations according to the contents of the common input data signal inDAT_cmn. On the other hand, the data input terminals mdio_in of the physical layer devices pDEV(GP2, 1) and pDEV(GP2, 2) of the device access group GP2 continue receiving the device input data devID2-1=devID2-2=0, so that the physical layer devices pDEV(GP2, 1) and pDEV(GP2, 2) are disabled.

In another case of the group selection signal gsSIG[1]=1, the inverted group selection signal gsSIGb[1]=0 is generated. At this time, the output of the input AND gates 251b and 252b remains 0 because of the input terminals in2=0; also, the output of the input AND gates 253a and 254a changes with the common input data signal inDAT_cmn received at the input terminals in1 because of the input terminals in2=1. Thus, the device input data devID1-1 and devID1-2 corresponding to the device access group GP1 and output from the input AND gates 251b and 252b remain 0 (the device input data devID1-1=devID1-2=0). On the other hand, the device input data devID2-1 and devID2-2 corresponding to the device access group GP2 and output from the input AND gates 253a and 254a are changed with the common input data signal inDAT_cmn.

Therefore, the data input terminals mdio_in of the physical layer devices pDEV(GP1, 1) and pDEV(GP1, 2) included in the device access group GP1 continue receiving the device input data devID1-1=devID1-2=0 as the MIDO input signals so that the physical layer devices pDEV(GP1, 1) and pDEV(GP1, 2) are disabled. On the other hand, the MDIO input signals mdio_in received at the data input terminals mdio_in of the physical layer devices pDEV(GP2, 1) and pDEV(GP2, 2) of the device access group GP2 are equivalent to the common input data signal inDAT_cmn (mdio_in=inDAT_cmn). Thus, the physical layer devices pDEV(GP2, 1) and pDEV(GP2, 2) of the device access group GP2 can selectively perform related operations according to the contents of the common input data signal inDAT_cmn.

Referring back to FIG. 7, if the determination result of step S605 is negative, the physical layer device pDEV(GPm, n), included in the previously designated device access group GPm and having a physical layer address consistent with the PHYADR field, further determines whether the input frame inFRM is a management frame mngFRM22 of Clause 22 (Step S610). If the determination result of step S610 is negative, the physical layer device pDEV(GPm, n) ignores the input frame inFRM. If the determination result of step S610 is positive, the input frame inFRM is confirmed to be the management frame mngFRM22 based on Clause 22 (see FIG. 1). Thus, the input frame inFRM is parsed, and related access operation is performed according to Clause 22 (Step S611). The details of Step S611 need not be described herein.

Figure 8:
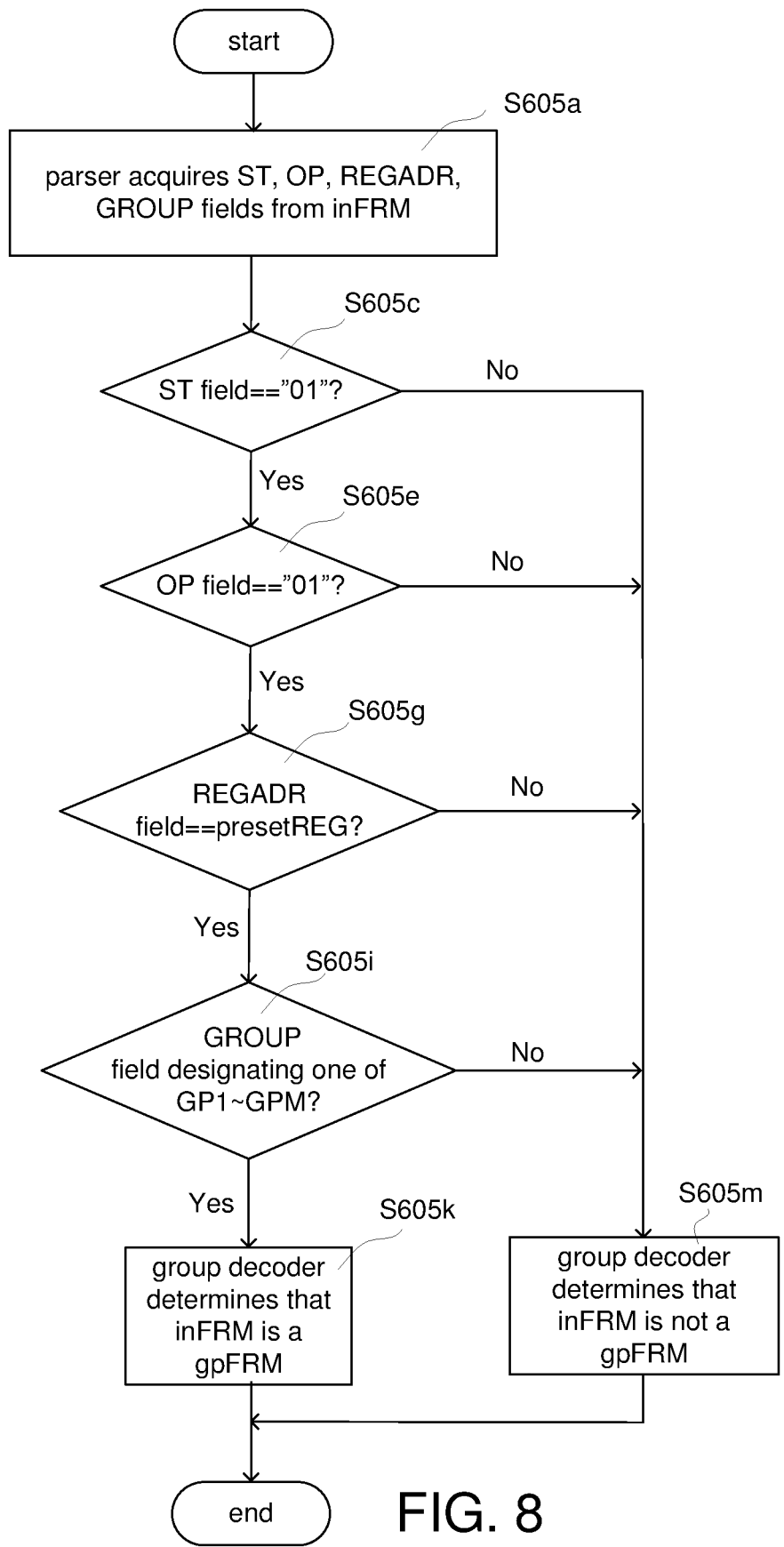
FIG. 8 is a flowchart showing how the group decoder determines whether the input frame inFRM is a group selection frame gpFRM or not.

FIG. 8 is a flowchart showing how the group decoder determines whether the input frame inFRM is a group selection frame gpFRM. FIG. 8 shows steps related to Step S605 in FIG. 7. Please refer to FIGS. 1, 3, and 8 together.

At first, the parser in the group detector 131c acquires the field values of the ST field (bit 1~bit 2 in the frame), the OP field (bit 3~bit 4 in the frame), the REGADR field (bit 5~bit 9 in the frame) and the DATA field (FIG. 1) or the GROUP field (FIG. 3) (bit 17~bit 32 in the frame) from the input frame inFRM (Step S605a).

Next, the group decoder 131c determines whether the field value of the ST field of the input frame inFRM (bit 1~bit 2 in the frame) conforms to the ST field defined by Clause 22 ("01") (Step S605c). If the determination result of step S605c is negative, the group decoder 131c confirms that the input frame inFRM is not a group selection frame gpFRM (Step S605m).

Then, the group decoder 131c determines whether the field value of the OP field (bit 3~bit 4 in the frame) of the input frame inFRM conforms to the WRITE operation as defined in Clause 22 (that is, the OP field value is "01") (Step S605e). If the determination result of step S605e is negative, the group decoder 131c confirms that the input frame inFRM is not a group selection frame gpFRM (Step S605m).

If the determination result of step S605e is positive, the group decoder 131c further determines whether the field value of the REGADR field (bit 5~bit 9 in the frame) of the input frame inFRM represents a preselected register presetREG (Step S605g). According to the concepts of the disclosure, the preselected register presetREG could be at least one of the registers REG2, REG3, REG5, REG6, REG8, REG10, and REG12. If the preselected register presetREG is a specific one of the registers REG2, REG3, REG5, REG6, REG8, REG10, and REG12, the design complexity of the group decoder 131c can be simplified. If the determination result of step S605g is negative, the group decoder 131c confirms that the input frame inFRM is not a group selection frame gpFRM (Step S605m).

According to the concepts of the disclosure, the input frame inFRM satisfied with both Steps S605e and S605g is considered to be satisfied with the predefined condition. In other words, when the input frame inFRM is satisfied with the predefined condition, the input frame inFRM has the OP field indicating WRITE operation and the REGADR field indicating the register address of any preselected register presetREG.

At last, the group decoder 131c determines whether the field value of the GROUP field of the input frame inFRM (bit 17~bit 32 in the frame) designates one of the device access groups GP1~GPM (Step S605i). Step S605i can prevent the MAC module from selecting an invalid device access group. For example, Step S605i can eliminate the case that the PHY module 13 only provides the device access groups GP1 and GP2, but the GROUP field transmitted by the MAC module designates the device access group GP3. If the determination result of step S605i is negative, the group decoder 131c determines that the input frame inFRM is not a group selection frame gpFRM (Step S605m). If the determination result of step S605i is positive, the group decoder 131c confirms that the input frame inFRM is a group selection frame gpFRM (Step S605k).

According to the above description, the disclosure provides the group decoder 131c, the input selection module 131e, and the output selection module 131i in the PHY module to cooperate with the MAC module 11 transmitting the group selection frame gpFRM. By doing so, the PHY module 13 can cover up to $K=2^{16}*2^5=2^{21}$ operable physical layer devices. Further, the network module 10 of the disclosure can adopt the circuits complying with Clause 22 in the existing device module 131g.

According to the concepts of the disclosure, the MAC module transmits the group selection frame gpFRM to the PHY module first. Thus, the MAC module can use the GROUP field of the group selection frame gpFRM to inform the PHY module about the designated device access group GPm. Then, the MAC module transmits the management frame mngFRM22, complying with Clause 22, to the PHY module. Thus, the MAC module can take advantage of the PHYADR field of the management frame mngFRM22 to inform the PHY module regarding the selected physical layer device pDEV(GPm, n) among the N[m] physical layer devices included in the device access group GPm.

As the MAC module driving the MDIO signal is usually implemented with software, the MAC module may freely transmit the management frame mngFRM22 or mngFRM45, complying with Clause 22 or Clause 45 to the PHY module. Alternatively, the MAC module may transmit the group selection frame gpFRM according to the disclosure to the PHY module to the PHY module. When the MAC module transmits the management frame mngFRM45 complying with Clause 45 as the input frame inFRM to the PHY module, the group decoder can identify the frame type by checking the ST field of the input frame inFRM, and then bypass the contents of the input frame inFRM complying with Clause 45.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A physical layer module, configured for being accessed by a media access control module via a management data input/output (MDIO) signal, wherein the physical layer module comprises:
   a group decoder, configured for decoding a common input data signal generated according to the MDIO signal to generate a group selection signal;
   an input selection module, electrically connected to the group decoder, comprising:
     X input circuits classified into M groups, configured for respectively generating X device input data according to the common input data signal and the group selection signal; and
   a device module, electrically connected to the input selection module, comprising:
     K physical layer devices classified into the M groups, configured for respectively receiving the X device input data from the X input circuits,
   wherein an m-th group among the M groups corresponds to at least one input circuit among the X input circuits and N[m] physical layer devices among the K physical layer devices, wherein
   when the group selection signal designates the m-th group,
   the at least one input circuit corresponding to the m-th group is configured for outputting at least one device input data to the N[m] physical layer devices according to the common input data signal and the group selection signal to make the N[m] physical layer devices selectively perform access operation according to the at least one device input data, and
   every input circuit, except the at least one input circuit, is configured to stop outputting corresponding device input data to disable remaining (K−N[m]) physical layer devices excluded in the m-th group,
   wherein X, M, K, m, and N[m] are positive integers, K is greater than N[m], and m is smaller than or equivalent to M.

2. The physical layer module according to claim 1, wherein when the group selection signal corresponds to the m-th group,
the at least one device input data among the X device input data changes with the common input data signal, and
every device input data among the X device input data except the at least one device input data remains unchanged.

3. The physical layer module according to claim 1, wherein:
the group decoder acquires field values of an operation code field, a physical layer address field, a register address field, and one of a group selection field and a data field of the common input data signal, and
the group decoder generates the group selection signal when the operation code field, the register address field and the group selection field are satisfied with a predefined condition.

4. The physical layer module according to claim 3, wherein the operation code field has a length of 2 bits, the physical layer address field has a length of 5 bits, the register address field has a length of 5 bits, the group selection field has a length of 16 bits, and the data field has a length of 16 bits.

5. The physical layer module according to claim 4, wherein the operation code field and the register address field are defined by Clause 22 of IEEE 802.3 standards.

6. The physical layer module according to claim 3, wherein the predefined condition is that the operation code field indicates WRITE operation, and the register address field indicates a register address of a preselected register.

7. The physical layer module according to claim 6, wherein the preselected register is at least one of a physical layer identifier register, an auto-negotiation link partner base page ability register, an auto-negotiation expansion register, an auto-negotiation link partner received next page register, a MASTER-SLAVE status register, and a power sourcing equipment status register.

8. The physical layer module according to claim 3, wherein M depends on S bits of the group selection field, and the group selection signal has a length of the S bits, wherein S is a positive integer, and S is smaller than M.

9. The physical layer module according to claim 3, wherein the media access control module uses the MDIO signal to transmit a first input frame and a second input frame to the physical layer module.

10. The physical layer module according to claim 9, wherein the group decoder comprises:
a parser, configured for acquiring the field values of the operation code field, the register address field, and the group selection field from the first input frame, and acquiring the field values of the operation code field, the physical layer address field, the register address field, and the data field from the second input frame.

11. The physical layer module according to claim 9, wherein the first input frame comprises a first start of frame field and the second input frame comprises a second start of frame field, wherein the first start of frame field is equivalent to the second start of frame field.

12. The physical layer module according to claim 9, wherein the N[m] physical layer devices have N[m] device addresses, respectively, and when the field value of the physical layer address field of the second input frame is consistent with a selected device address of the N[m] device addresses, among the N[m] physical layer devices, a selected physical layer device having the selected device address among the N[m] device addresses performs the access operation according to the field values of the operation code field and the data field of the second input frame; and
among the N[m] physical layer devices, remaining (N[m]−1) physical layer devices having remaining (N[m]−1) device addresses among the N[m] device addresses except the selected device address stop the access operation.

13. The physical layer module according to claim 9, wherein each of the K physical layer devices comprises:
a data input terminal, electrically connected to one of the X input circuits, configured for selectively receiving one of the X device input data from the one of the X input circuits;
a data output terminal, configured for outputting an original device output data when the data input terminal receives the one of the X device input data, and the field value of the operation code field of the second input frame indicates WRITE operation; and
an output data enable terminal, configured for outputting a device output enable signal according to a comparison result of the field value of the physical layer address field of the second input frame and a device address.

14. The physical layer module according to claim 13, further comprising:
an output selection module, electrically connected to the device module, comprising:
K output AND gates, respectively electrically connected to the K physical layer devices, wherein each of the K output AND gates is configured for performing AND operation on the original device output data and the device output enable signal transmitted from a corresponding one of the K physical devices to output one of K enabled device output data;
a first OR gate, electrically connected to the K output AND gates, configured for performing first OR operation on the K enabled device output data to generate a physical layer output data; and
a second OR gate, electrically connected to the K physical layer devices, configured for performing second OR operation on the K device output enable signals transmitted from the K physical layer devices to generate a physical layer output enable signal.

15. The physical layer module according to claim 14, further comprising:
a buffer module, comprising:
a first buffer circuit, electrically connected to the media access control module, the group decoder, and the input selection module, configured for receiving a management data clock signal from the media access control module; and
a second buffer circuit, electrically connected to the media access control module, the group decoder, the input selection module, and the output selection module, configured for receiving the MDIO signal from the media access control module, or transmitting the MDIO signal to the media access control module.

16. The physical layer module according to claim 1, wherein X is equivalent to M.

17. The physical layer module according to claim 16, wherein the at least one input circuit comprises an m-th input circuit, and the N[m] physical layer devices receive an m-th device input data from the m-th input circuit simultaneously.

18. The physical layer module according to claim 1, wherein X is equivalent to K.

19. The physical layer module according to claim 18, wherein the at least one input circuit comprises N[m] input circuits, and the N[m] physical layer devices respectively receive the N[m] device input data from the N[m] input circuits.

20. A network module, comprising:
- a media access control module, configured for transmitting or receiving a management data input/output (MDIO) signal; and
- a physical layer module electrically connected to the media access control module, configured for being accessed by the media access control module via a management data input/output (MDIO) signal, wherein the physical layer module comprises:
  - a group decoder, configured for decoding a common input data signal generated according to the MDIO signal to generate a group selection signal;
  - an input selection module, electrically connected to the group decoder, comprising:
    - X input circuits classified into M groups, configured for respectively generating X device input data according to the common input data signal and the group selection signal; and
  - a device module, electrically connected to the input selection module, comprising:
    - K physical layer devices classified into the M groups, configured for respectively receiving the X device input data from the X input circuits,
  - wherein an m-th group among the M groups corresponds to at least one input circuit among the X input circuits and N[m] physical layer devices among the K physical layer devices, wherein
  - when the group selection signal designates the m-th group,
  - the at least one input circuit corresponding to the m-th group is configured for outputting at least one device input data to the N[m] physical layer devices according to the common input data signal and the group selection signal to make the N[m] physical layer devices selectively perform access operation according to the at least one device input data, and
  - every input circuit, except the at least one input circuit, is configured to stop outputting corresponding device input data to disable remaining (K−N[m]) physical layer devices excluded in the m-th group,
  - wherein X, M, K, m, and N[m] are positive integers, K is greater than N[m], and m is smaller than or equivalent to M.

* * * * *